July 2, 1963

G. A. BROWN 3,096,478

APPARATUS WITH CONDUCTIVE GAS ELECTRODES FOR DETECTING
NON-UNIFORMITY IN ELECTRICALLY INSULATING AND
ELECTRICALLY SEMI-CONDUCTING MATERIALS

Filed Aug. 18, 1959

INVENTOR.
GEORGE A. BROWN

BY
*James H. Bethell*
ATTORNEY

July 2, 1963 G. A. BROWN 3,096,478
APPARATUS WITH CONDUCTIVE GAS ELECTRODES FOR DETECTING
NON-UNIFORMITY IN ELECTRICALLY INSULATING AND
ELECTRICALLY SEMI-CONDUCTING MATERIALS
Filed Aug. 18, 1959 2 Sheets-Sheet 2
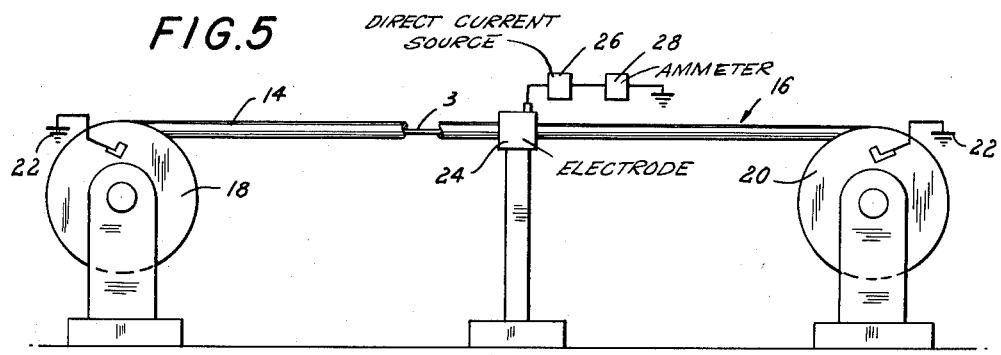
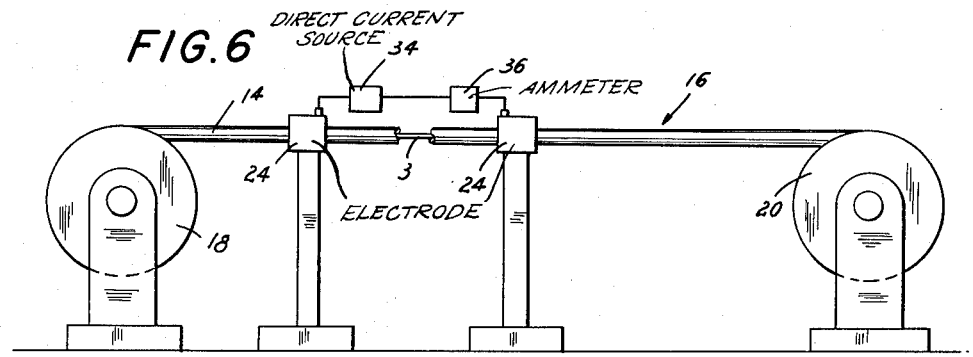
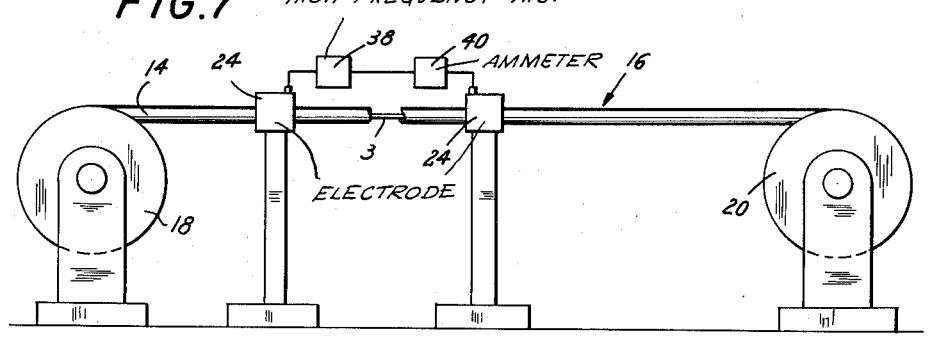
INVENTOR.
GEORGE A BROWN
BY
ATTORNEY United States Patent Office 3,096,478
Patented July 2, 1963

3,096,478
APPARATUS WITH CONDUCTIVE GAS ELECTRODES FOR DETECTING NON-UNIFORMITY IN ELECTRICALLY INSULATING AND ELECTRICALLY SEMI-CONDUCTING MATERIALS
George A. Brown, Clifton, N.J., assignor to The Okonite Company, Passaic, N.J., a corporation of Delaware
Filed Aug. 18, 1959, Ser. No. 834,526
8 Claims. (Cl. 324—54)

This invention is directed to apparatus for detecting non-uniformity in insulating and semi-conducting materials.

In the electric cable industry, for example, there is a need for a quality-control measurement of cable on an incremental length basis to detect any non-uniformity in the cable's electrical characteristics. The term "non-uniformity" is to be interpreted as meaning that there is at least one increment of cable length which has electrical characteristics differing from the electrical characteristics of the other increments of the cable length. Cable non-uniformity can be due to such things as dead leaks, surface leakage paths, changes in insulation resistance, or changes in cable capacity.

It is an object of this invention to provide an apparatus for detecting non-uniformity of the cable. It is a further object to provide means to determine the specific cause for the non-uniformity, i.e., change in insulation resistance or other cause mentioned above.

In the drawings accompanying this application,

FIG. 5 is a layout of apparatus, embodying the invention, for detection of non-uniformity due to dead leaks;

FIG. 6 is a layout of an apparatus, embodying the invention, for detection of non-uniformity due to surface leakage; and FIG. 7 is a layout of an apparatus, embodying the invention, for the detection of non-uniformity due to a change in cable capacity.

Basically, the detection of non-uniformity of cable is accomplished by the uniform application of charge to each successive increment of the insulation surface by a direct-current stress through the insulation and a later measurement of the charge condition of each increment.

Figure 1:
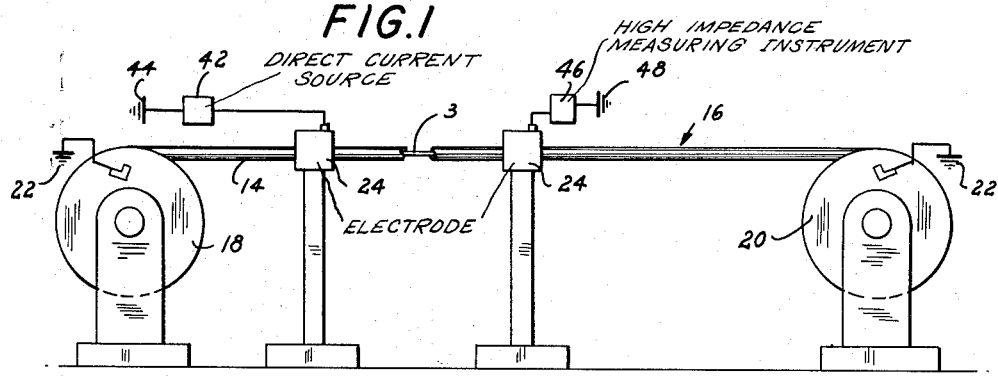
FIG. 1 is a layout of an apparatus, embodying the invention, for the detection of cable non-uniformity.

In the layout of FIG. 1 two suitable electrodes are set up so that the first electrode 24 provides a means for applying a constant direct-current stress from a direct-current source 42 between the grounded conductor 3 and the surface of the insulation 14 of a cable 16, and a second electrode 24 is connected to a very high impedance measuring instrument 46, such as an electrometer, to measure the direct-current potential difference between the conductor 3 and the insulation surface. If the cable 16 is caused to pass from let-off reel 18 to take-up reel 20 through the two electrodes 24 at a constant rate of travel, then each increment of the cable length will be subjected to the same direct-current stress; hence, if the cable is uniform, the detecting instrument 46 will indicate a constant level of the charge conditions at the second electrode. On the other hand, cable non-uniformity will be indicated by a change in the instrument reading. Under specific cable speeds and other fixed controls, standards can be determined in terms of the instrument readings. In FIG. 1, 22 designates the ground for conductor 3, while 44 and 48 designate the ground for direct-current source 42 and for the measuring instrument 46.

Mention has been made in the preceding paragraph of the use of "suitable" electrodes. Upon reference to FIG. 1 it will be seen that, first of all, a "suitable" electrode must be one which will not wet the surface of the insulation 14, inasmuch as such wetting would provide a conducting path between the two electrodes 24, and the test would fail. Thus, the first requirement of a suitable electrode is that it be non-wetting.

A cable non-uniformity that is important to detect is a dead leak through the insulation. A dead leak caused by a protruding strand, for example, could easily be missed by an electrode which does not have complete contact with the cable surface. Thus, a second requirement of a suitable electrode is that it provides complete contact with the cable surface of the increment of cable length which is at the electrode.

The detection of a dead leak such as a pin hole through the insulation requires a conducting path through the hole to the conductor, and while an electrode employing a very free-flowing liquid would provide such a conducting path, such an electrode would also cause surface wetting, which, as above mentioned, unfits such an electrode for use in the practice of this invention. The third requirement for a suitable electrode, then, is that it provide a conducting path through a pin hole in the insulation without wetting.

Another requirement is that the electrode be non-frictional. Obviously, if frictional charges were allowed to be deposited on the cable surface, they would be detected at the measurement instrument and give a false indication of cable non-uniformity.

An electrode satisfying the above requirements could be called "an infinite-contact, non-wetting, non-frictional electrode." The meaning of the last two terms is obvious but "infinite contact" is to be interpreted as meaning complete contact with the surface of the cable increment at the electrode, including a conducting path down through a pin hole to the conductor, should such a pin hole be present.

Figure 2:
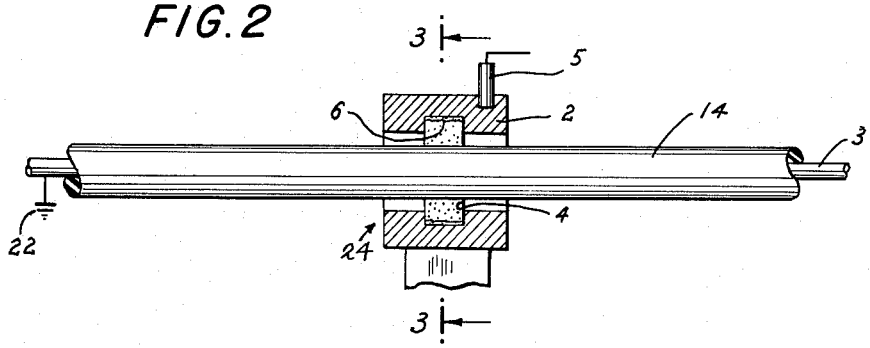
FIG. 2 is a view in section of an electrode useful in the practice of this invention.
Figure 3:
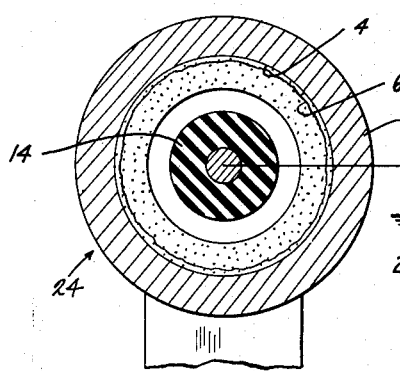
FIG. 3 is a section taken on the line 3—3 of FIG. 2.

FIGS. 2 and 3 show an infinite-contact, non-wetting, non-frictional electrode. The electrode of these two views comprises a metal tube or sleeve 2 containing air or other gas. The tube is internally grooved circumferentially, as seen at 4, and the groove contains a radioactive isotope material 6, preferably of the alpha-particle radiation type. The function of the isotope material is to ionize the air or other gas within the tube so that the gas becomes electrically conducting, the stud 5 and the tube 2 acting as a means to connect a voltage supply or a test instrument to the electrically conducting gas. It can be seen that, since the contacting portion of the electrode is a gas, we have the desired infinite-contact and non-wetting requirements. To insure that the device be non-frictional, it is merely necessary that the tube be large enough internally to allow the cable to pass through without contacting the metal sides of the tube, noting that the isotope material mentioned is capable of ionizing the air or other gas within two inches of the material.

It will be appreciated that the particular configuration chosen is most suitable for cable measurements since cables are usually round; however, if the material to be measured were differently shaped, an electrode of more suitable shape could be used.

Figure 4:
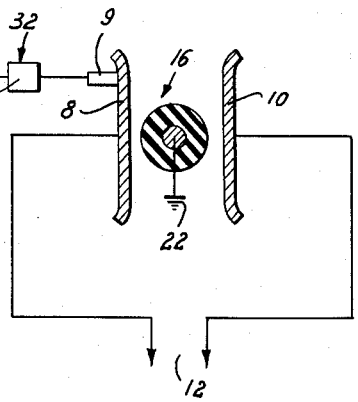
FIG. 4 is a view in section of another form of electrode useful in the practice of this invention.

The electrode illustrated in FIG. 4 comprises two spaced-apart metallic plates 8 and 10, ionization of the air or other gas between the plates being effected by connecting the plates to an electrical ionization source 12, which may be either alternating current or direct current. While the ionization voltage must be sufficient to produce adequate conductivity of the air or other gas employed, it must not be sufficient to cause complete breakdown of this gas. As illustrated in FIG. 4, there is a separate voltage supply 32, which, together with the electrode, has the same purpose as the first electrode 24 and its source 42 had in FIG. 1. It is to be understood that the electrode of FIG. 4 may be used for the same purposes as those of the electrode illustrated in FIGS. 2 and 3. Furthermore, a combination of electrical and isotope ionization could be used as well as other ionizing agents, such as ultra-violet light, within the purview of this invention.

It can be seen that, with the apparatus illustrated in FIG. 1 and employing the electrodes illustrated in FIGS. 2 and 3 or 4, means are provided for detecting non-uniformity in a cable. If it is desired to find the specific cause of this non-uniformity, tests can be made which are specifically designed to indicate the nature of the non-uniformity.

FIG. 5 illustrates an apparatus for detecting dead leaks, such as pinholes or small strands protruding through the insulation. In this drawing, the insulating covering 14 of an electric cable 16 is to be examined. The cable is forwarded continuously from the let-off reel 18 and rewound upon the take-up reel 20. The cable conductor is grounded, as illustrated at 22. In its passage from reel 18 to reel 20, the cable passes through an electrode 24 of the type described above. The infinite-contact feature of the electrode will cause ionization of the air in a pinhole in the insulation, thereby providing for its detection as easily as the detection of a protruding strand. The electrode is connected to a suitable direct-current source 26, which stresses the cable insulation. A dead leak will be detected by an ammeter 28, or other suitable device, in the circuit.

FIG. 6 illustrates a layout for surface leakage measurements. It will be seen from this drawing that the cable 16 is advanced continuously and successively through the two electrodes 24 while maintaining the two electrodes at a constant direct-current potential difference by the direct-current source 34. An ammeter 36 in this circuit will provide a means for detecting surface leakage conditions, since the only conducting path between the electrodes will be the surface of the insulation 14 of the cable, and an increased current reading will indicate an increase in surface conductivity. The cable conductor is not referenced to this circuit.

After the cable has had all dead leaks and surface leakage problems repaired, a test for changes in cable capacity may be carried out as illustrated in FIG. 7, in which 38 designates a high-frequency, alternating-current, constant-voltage source, which maintains a potential difference between the two electrodes 24. The setup is such that the lowest impedance path will be through the capacitive coupling from the first electrode 24 to the cable conductor 3, thence through the constant conductor length between the two electrodes, and finally through the capacitive coupling between the cable conductor and the second electrode 24.

With the cable advancing at a constant speed from let-off reel 18 to rewind reel 20, the only variables that will affect the total impedance to this circuit will be changes in the insulation resistance or changes in the cable capacity, since dead leaks and surface leakage paths have already been eliminated. The variations in insulation resistance will have negligible effects on the total impedance, since the cable capacity can be considered in parallel with this resistance, and the high-frequency capacitive impedance will shunt out the resistance over its range of variations. Thus, a system is provided whose impedance is essentially constant except for changes in cable capacity. A high-frequency ammeter 40 or other suitable device for detecting changes in the circuit impedance will, therefore, indicate changes in the cable capacity.

Changes in the insulation resistance can be detected by the charge decay test described above and illustrated in FIG. 1. As already mentioned, this test indicates a change which may be due to (1) dead leaks, (2) surface leakage, (3) changes in cable capacity, or (4) changes in insulation resistance. If the three tests described above show that there are no dead leaks and no surface leakage paths and that there are no changes in the cable capacity, then the charge decay test indicates changes in the insulation resistance only. Therefore, the charge decay test has two purposes. When used alone, this test indicates non-uniformity due to various causes. When used in conjunction with the tests for dead leaks, surface leakage, and cable capacity, the charge decay test indicates non-uniformity specifically due to changes in insulation resistance.

In all of the foregoing it is to be understood that adequate insulating means is provided in each case, so that the supporting stands for the electrodes do not provide conducting paths to or from the electrodes.

It will be apparent from all of the foregoing that the present invention provides an apparatus for examining incremental lengths of electrically insulating and electrically semi-conducting materials on cables for non-uniformity of electrical characteristics, the invention also providing apparatus for determining the specific cause of the non-uniformity such as a dead leak, surface leakage, change in cable capacity, or change in insulation resistance.

It will also be apparent that the electrodes employed in the practice of this invention are of such a nature that infinite or total contact is made with the surface of the material being examined, and that wetting and friction at the areas under examination are totally absent.

The apparatus of this invention has been described, for illustrative purposes and clarity of description, in connection with insulation on cables; however, it is to be understood that the apparatus is equally applicable to the same electrical tests on insulating and semi-conducting materials not fabricated into cable insulation. In such a case, some conducting member must be provided to perform the function of the conductor in each of the tests described above.

It is to be understood that changes may be made in the details of construction and arrangement of parts hereinabove described without departing from the spirit and scope of the invention.

What I claim is:

1. Apparatus for detecting dead leaks in the insulating and semi-conducting coverings of conductors, said apparatus comprising, in combination, an electrode of conducting gas; means for advancing a grounded, covered conductor through the gas of said electrode, progressively to effect contact of the conducting gas with the entire surface of that portion of the conductor covering which at any instant is within the electrode; a source of electrical energy electrically connected to said electrode for maintaining a constant potential difference between said electrode and grounded conductor; and means in the circuit thus provided for measuring the current flowing from said energy source through said electrode and said conductor.

2. Apparatus for examining electrically insulating and semi-conducting solid materials for surface leakage, said apparatus comprising, in combination, two electrodes of conducting gas; a direct-current source of electrical energy connected across said electrodes for maintaining a constant direct-current potential difference between said electrodes; means for advancing the material being examined through the conducting gas of the electrodes, progressively to effect contact of the conducting gas with the entire surface of those portions of the material being examined which at any instant are within the electrodes; and means connected in series with said energy source and said electrodes for measuring the current flowing from the energy source through one electrode, along the surface of the material being examined, through the other electrode and said measuring device, back to said energy source, thereby to indicate the surface leakage condition of the material being examined.

3. Apparatus for detecting non-uniformity in the capacity of an insulating covering of a conductor, said apparatus comprising, in combination, two spaced electrodes of conducting gas; a source of electrical energy connected across said electrodes for maintaining a constant, high-frequency, alternating-current potential difference between the electrodes; means for advancing a covered conductor successively through the conducting gas of said electrodes, progressively to effect contact of the conducting gas with those portions of the conductor covering which at any instant are within the electrodes; and means in series with the said energy source for detecting changes in the impedance of the circuit consisting of the two electrodes and that portion of the conductor which is between the electrodes due to changes in the conductor capacity.

4. Apparatus for detecting changes in the insulation resistance of a covering of a grounded conductor, which covering is uniform with respect to dead leaks, surface leakage, and capacity, said apparatus comprising, in combination, two spaced electrodes of conducting gas; means for advancing the covered conductor successively through said electrodes at a constant rate of speed; a source of electrical energy connected to the first of said electrodes encountered in the direction of movement of the conductor for maintaining a constant, direct-current potential difference between the electrode and the grounded conductor; and means electrically connected to the grounded conductor and to the other electrode for measuring the charge conditions at said other electrode.

5. An electrode for detecting flaws in the covering of electric conductors, said electrode comprising a gas-filled, tubular member open at each end and of such internal dimensions that the covered conductor may be advanced therethrough out of physical contact with the tubular member; a means for connecting a source of electrical energy to said tubular member; and means for ionizing the gas within the tubular member, thereby to provide a conducting path between the said energy source and the surface of a conductor covering advancing through the tubular member.

6. The electrode of claim 5 in which the tubular member is lined with a radioactive isotope material for ionizing the gas within the tubular member.

7. Apparatus for progressively testing for non-uniformity the solid, electrically insulating and semi-conducting coverings of electric conductors, said apparatus comprising, in combination, a pair of metallic plates, gas-spaced from each other; means for advancing a grounded conductor between said plates, said conductor being covered with a material selected from a group consisting of electrically insuating material and electrically semi-conducting material, the space between said plates being sufficiently wide to permit the passage of the covered conductor between the plates with the conductor covering at all times out of physical contact with either plate; means for ionizing the gas between the plates so that the same becomes electrically conducting; and a source of electrical energy connected to ground and to one of said plates, progressively to stress the conductor covering as the conductor is advanced through the electrically conductive gas between the plates.

8. The apparatus of claim 7, in which the means for ionizing the gas between the plates is electrical.

References Cited in the file of this patent

UNITED STATES PATENTS

| 1,652,538 | Marbury | Dec. 13, 1927 |
| 2,395,623 | Goldstein et al. | Feb. 26, 1946 |
| 2,576,616 | Livingston et al. | Nov. 27, 1951 |
| 2,701,336 | Anderson | Feb. 1, 1955 |
| 2,713,662 | Hart | July 19, 1955 |
| 2,856,582 | Anderson | Oct. 14, 1958 |
| 2,927,269 | Ecker et al. | Mar. 1, 1960 |

FOREIGN PATENTS

| 416,308 | Great Britain | June 5, 1933 |